United States Patent [19]

Barth et al.

[11] Patent Number: 5,581,028

[45] Date of Patent: Dec. 3, 1996

[54] FLUID PROPERTY SENSORS INCORPORATING PLATED METAL RINGS FOR IMPROVED PACKAGING

[75] Inventors: Phillip W. Barth, Portola Valley; Michel G. Goedert, Mt. View, both of Calif.; Erwin Littau, Leavenworth, Wash.

[73] Assignee: Hewlett Packard Company, Palo Alto, Calif.

[21] Appl. No.: 265,084

[22] Filed: Jun. 23, 1994

[51] Int. Cl.⁶ .................................................. G01F 1/68
[52] U.S. Cl. ................................. 73/204.26; 73/23.42
[58] Field of Search .............................. 73/273, 272 R, 73/118.2, 204.26, 721, 727, 23.42, 46, 47

[56] References Cited

U.S. PATENT DOCUMENTS

| | | |
|---|---|---|
| 4,471,647 | 9/1984 | Jerman et al. |
| 4,474,889 | 10/1984 | Terry et al. |
| 4,478,076 | 10/1984 | Bohrer . |
| 4,478,077 | 10/1984 | Bohrer et al. |
| 4,501,144 | 2/1985 | Higashi et al. |
| 4,548,078 | 10/1985 | Bohrer et al. |
| 4,935,040 | 6/1990 | Goedert . |
| 5,144,843 | 9/1992 | Tamura et al. ............................. 73/721 |
| 5,220,830 | 6/1993 | Bonne ................... 73/204.26 |
| 5,319,980 | 6/1994 | Kremidas ................................. 73/721 |
| 5,396,795 | 3/1995 | Araki ................... 73/204.26 |
| 5,437,189 | 8/1995 | Brown et al. ............................. 73/721 |

*Primary Examiner*—Richard Chilcot
*Assistant Examiner*—Harshad Patel

[57] ABSTRACT

A semiconductor flow sensor provides a self-aligning seal between the sensor and a manifold carrying the fluid being measured. The sensor includes a sensing element and a semiconductor body having a fluid flow region formed therein. The sensing element crosses through a portion of the flow region and is supported by the semiconductor body. A characteristic of the fluid flowing through the flow region is measured by operation of the sensing element. A sealing ring integrally disposed on the semiconductor body surrounds the flow region and further provides a seal between the sensor and a manifold. To ensure accurate placement of the sealing ring with respect to the sensing element, the sealing ring is electroplated to the semiconductor body prior to formation of the flow region. A pressure and temperature stable seal between the sensor and the manifold is achieved by either compression of the sealing ring, or solder bonding of the sealing ring to the manifold. The direction of fluid flow relative to the flow sensor is either perpendicular or parallel to a plane formed by the sensor.

17 Claims, 12 Drawing Sheets

FLUID PROPERTY SENSORS INCORPORATING PLATED METAL RINGS FOR IMPROVED PACKAGING

1. FIELD OF THE INVENTION

This invention relates to fluid flow sensors and actuators, and more particularly, to a semiconductor flow sensor having a plated metal ring to provide a seal between the sensor and a manifold carrying the fluid being measured.

2. BACKGROUND OF THE INVENTION

Semiconductor flow sensors are commonly used to measure the flow characteristics of a fluid or gas sample. In the field of gas chromatography, for example, semiconductor flow sensors are used to detect individual components of a fluid sample as it flows through a tube or capillary. The flow sensor can detect changes in a physical or chemical property of the fluid, such as the fluid's velocity or thermal conductivity, and produce an electrical signal representative of the property changes.

One such flow sensor utilizes an electrically resistive metal film as a sensing element. The metal film extends across a substrate channel provided for receiving a fluid flow from a manifold so that the film crosses through the fluid path and is entirely bathed in the fluid stream. To operate the sensor, the metal film is heated by passing an electric current through the film. Heat from the metal film is conducted to the moving fluid at a rate determined by the thermal conductance through the fluid to the substrate and to the manifold, and by the convective cooling of the moving fluid. For a given electrical input power, the temperature of the metal film depends in part on the properties of the fluid. Since the metal film will typically have a non-zero temperature coefficient of resistance, the temperature of the film can be monitored by measuring the electrical resistance of the film. Accordingly, transduction from fluid property to electrical resistance can be achieved.

Depending upon the application and the type of flow data desired, the sensor can be disposed so that the direction of fluid flow is either perpendicular to the plane in which the metal film lies, or parallel to that plane. Additional information can be obtained, such as flow velocity, by including a plurality of metal film elements disposed along the flow path of the fluid. By modulating the electric current provided to an upstream metal film element at a predetermined frequency, a thermal pattern corresponding to the frequency would be conducted into the fluid. Thus, the flow rate of the fluid can be determined by measuring the phase difference of the resistive changes detected at a downstream metal film element.

In order to obtain a high degree of sensor data reproducibility, the sensing element should be accurately positioned with respect to the fluid flow path. Moreover, the sensors should be sealed to withstand high operating temperatures and pressures. Accordingly, the attachment of the sensor to the manifold is critical to the proper functioning of the sensor. One conventional approach to providing a seal between the sensor and manifold is disclosed in U.S. Pat. No. 4,471,647 to Jerman et al., entitled GAS CHROMATOGRAPHY SYSTEM AND DETECTOR AND METHOD. Jerman teaches the use of a gasket which is clamped between the sensor and manifold.

While a gasket provides an adequate seal for certain applications, dimensional variations and inconsistencies of the gasket material can result in inaccurate positioning of the metal film with respect to the fluid flow. Precision alignment of the gasket with respect to the sensor and manifold during manufacturing is difficult to achieve, and is further exacerbated given the current trend toward miniaturization of gas chromatography devices. Misalignment of the sensor/manifold interface is known to cause undesirable perturbation of the fluid flow pattern with resulting degradation of measurement accuracy. Moreover, conventional gasket materials are often incapable of withstanding the increasingly high pressure (above 100 pounds per square inch) and temperature (above 450 degrees Celsius) demands placed upon current sensor capabilities.

Therefore, a critical need exists for a semiconductor flow sensor that is capable of forming a seal with the manifold. The flow sensor should provide for accurate alignment of the metal film to the fluid flow channel and should be chemically and mechanically stable at high temperature and pressure values. The sensor should also be relatively easy to batch fabricate at the semiconductor level.

SUMMARY OF THE INVENTION

This invention provides a semiconductor flow sensor for use with a manifold providing a self-aligning seal between the sensor and the manifold. The sensor is capable of measuring a fluid flow characteristic and producing a corresponding electric signal. Electrical connection to the sensor is made outside of the flow environment.

In an embodiment of the invention, the semiconductor flow sensor includes a sensing element and a semiconductor body having a depression formed therein. The sensing element bridges across a portion of the depression and is supported by the semiconductor body. A characteristic of a fluid flowing through the depression is measured by operation of the sensing element. A sealing ring integrally disposed on the semiconductor body surrounds the depression, forming a portion of a fluid flow channel provided by the depression. The sealing ring further provides a seal between the sensor and the manifold. To ensure accurate placement of the sealing ring with respect to the sensing element, the sealing ring is deposited by patterned plating techniques on the semiconductor body prior to formation of the depression. A stable seal between the sensor and the manifold is achieved by either compression of the sealing ring, or bonding of the sealing ring to the manifold by techniques such as soldering, brazing, welding or gluing.

In an embodiment of the invention, alignment of the sealing ring to the manifold is provided by an alignment wall disposed on a mating surface of the manifold. The alignment wall forms a boundary for receiving the sealing ring to ensure accurate positioning of the flow sensor with respect to the manifold.

The invention further provides a method for batch fabricating a flow sensor from a semiconductor substrate base having a conductive layer sandwiched between insulative layers on at least a first surface of the substrate base. The conductive and insulative layers are selectively etched to provide a sensing element. A sealing ring circumscribing the sensing element is plated above the insulative layers formed on the substrate base. The substrate base is then selectively etched below the sensing element to provide a flow region around the sensing element for a fluid to be measured. Control of the amount of sealing ring material plated onto the insulative layers determines the depth of the sensing element within the flow region between the manifold and the sensing element.

A more complete understanding of the fluid property sensors and actuators incorporating plated metal rings will be afforded to those skilled in the art by a consideration of the following detailed description of the preferred embodiment. Reference will be made to the appended sheets of drawings which will be first described briefly.

DESCRIPTION OF THE PREFERRED EMBODIMENT

This invention discloses an improved semiconductor flow sensor for detecting a characteristic of a fluid flowing from a manifold, and a method for fabricating the improved flow sensor. The invention provides a seal between the sensor and the manifold capable of withstanding high temperature and pressure. In addition, the flow sensor of the invention is relatively easy to manufacture utilizing conventional batch semiconductor fabrication techniques.

Figure 1:
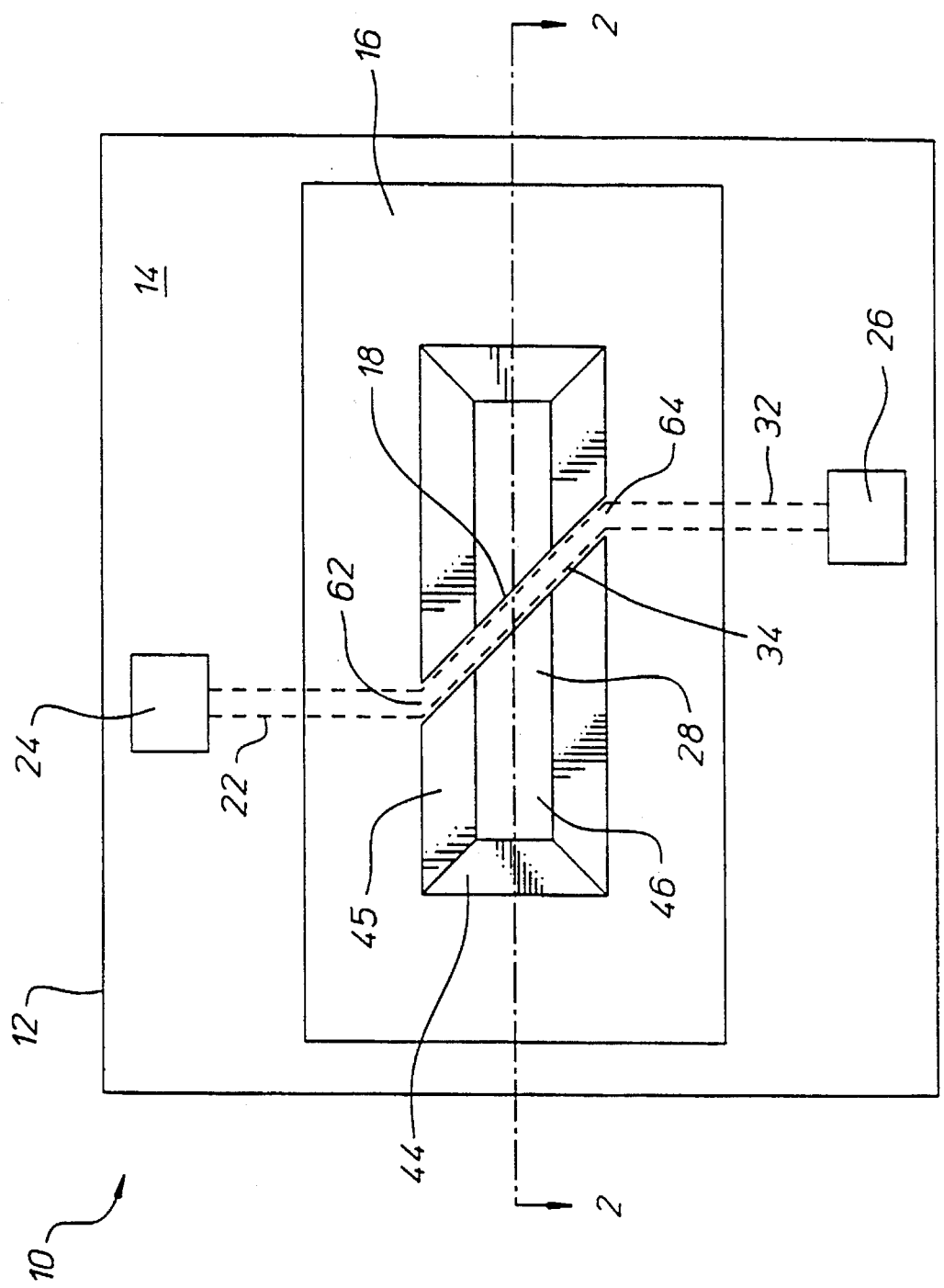
FIG. 1 is a plan view of a semiconductor flow sensor of this invention.
Figure 2:
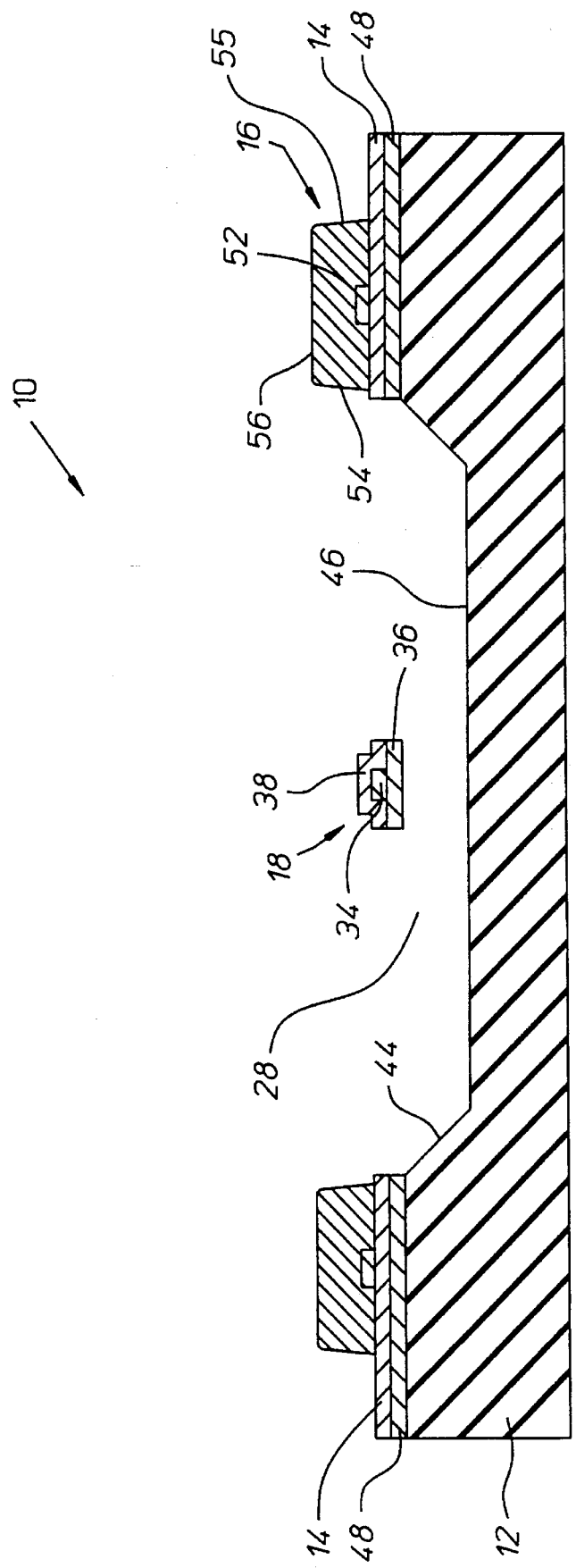
FIG. 2 is a side view of the semiconductor flow sensor, taken through the section 2—2 of FIG. 1.

Referring first to FIGS. 1 and 2, a semiconductor flow sensor 10 is illustrated. The flow sensor 10 has a substrate base 12 of a semiconductor material, such as silicon. The upper surface 14 of the sensor 10 has an electrically insulative coating, such as low-stress silicon nitride. An additional layer 48 of silicon nitride may be disposed between the outer layer 14 and the substrate base 12. Centrally disposed on the sensor 10 is a depression 28 formed into the substrate 12, having a floor 46 and sloping side walls 44, 45. The depression 28 forms a portion of a flow region for a fluid conducted from the manifold.

A sensing element 18 bridges across the flow channel 28, as illustrated in FIG. 1. The sensing element 18 comprises a metal film 34 of resistive material, such as platinum. Electrically insulative material is disposed both below 36 and above 38 the metal film 34, adding structural strength to the sensing element. It should be appreciated that the structure of the resistive sensing element 18 is simplified for purposes of the present disclosure, but that more complex bridging structures employing a multiplicity of holes in a membrane or membranes containing resistive heating elements, resistive sensing elements, or both, can be used.

The peripheral ends 62, 64 of the sensing element 18 at the periphery of the depression 28 electrically connect with conductive pathways 22, 32 provided below the outer surface 14 of the sensor 10 to electrical contact pads 24, 26. The electrical contact pads 24, 26 provide for electrical connection of the sensing element 18 to an external voltage source for conducting a current through the sensing element. The contact points 24, 26 are disposed outside of the flow region, and are thus protected from any deleterious effects of the fluid flow environment, such as corrosion.

A sealing ring 16 is disposed on the sensor 10 extending upwardly from the outer surface 14. The ring 16 comprises a non-corrosive metal, including a base metal such as plated nickel or copper or an alloy, covered by an inert or noble or soft metal such as gold or a solderable metal such as tin. The sealing ring 16 has inner walls 54, outer walls 55 and an upper surface 56. The sealing ring substantially surrounds the depression 28, with the inner walls 54 providing an additional portion of the flow region. The sealing ring 16 has a substantially flat upper surface 56.

The depression 28 and the sensing element 18 are fabricated by conventional processes, such as photolithography and/or etching, as will be explained below. The diagonal placement of the sensing element 18 with respect to the depression 28 and sealing ring 16 serves a functional purpose in that it permits the caustic etchant that forms the depression 28 to undercut the sensing element during fabrication of the depression, in a manner known to those skilled in the art of silicon etching. It should be appreciated, however, that alternative configurations for the position of the sensing element 18 with respect to the depression 28 are possible.

Figure 3:
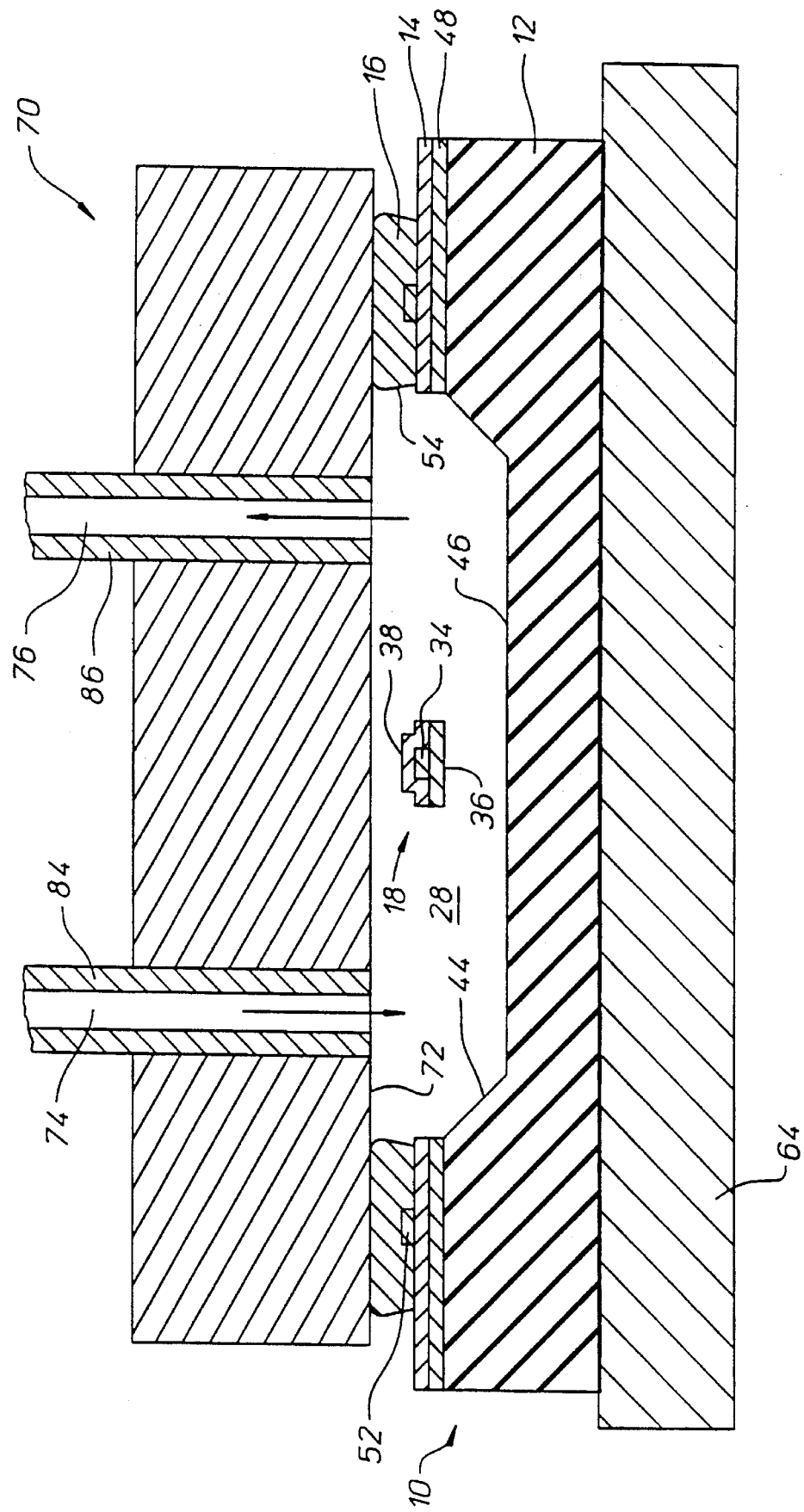
FIG. 3 is a side view of the semiconductor flow sensor as in FIG. 1, illustrating a sealing ring in a compression engagement with a manifold.

FIG. 3 illustrates a semiconductor flow sensor 10 in use with a manifold 70. The manifold 70 has a mating surface 72 and capillaries 84 and 86 which extend through the manifold to the mating surface. Capillary 84 provides a fluid intake 74, and capillary 86 provides a fluid exhaust 76. The mating surface 72 provides a further bonding portion of the flow region 28.

The sensor 10 is held in place relative to the manifold 70 by a header 64 disposed at a side of the sensor opposite from the manifold. A force applied to the header 64 by fasteners, such as bolts, causes the sealing ring 16 to compress by contact with the manifold. The compressive force on the sealing ring 16 forms a seal for the flow region. Fluid provided to the flow region through the intake 74 is caused to flow both below and above the sensing element 18 before leaving the flow region through the exhaust 76. This embodiment is advantageous for high temperature operation, since no material having a low melting point is present in the overall structure.

Figure 4:
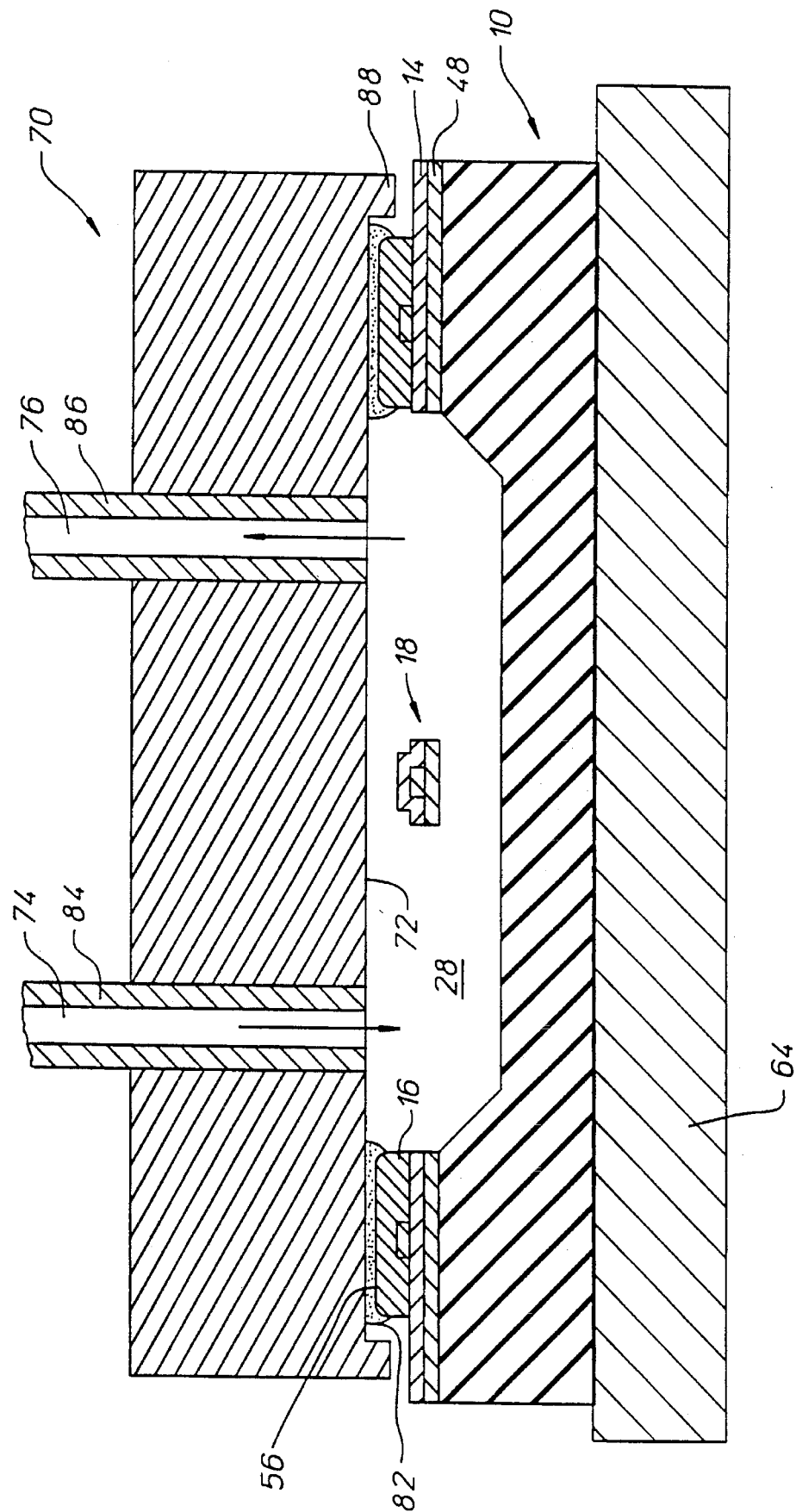
FIG. 4 is a side view of the semiconductor flow sensor as in FIG. 1, illustrating the sealing ring in a solder bond engagement with the manifold.

FIG. 4 illustrates an alternative embodiment of the flow sensor 10. As shown in FIG. 2, the upper surface 56 of the sealing ring 16 bonds to the mating surface 72 of the manifold 70 by use of a bonding material, such as solder 82. In this embodiment, the header 64 would not apply the same degree of compressive force on the sensor 10 as described above with respect to FIG. 3. Instead, the seal around the flow region 28 is formed by the solder 82. As known in the art, the solder based joint forms a semipermanent seal for the sensor 10 to the manifold 70, which is removable as desired. This embodiment is advantageous for use in relatively low temperature applications, since the solder would otherwise melt at high temperatures.

To improve the quality of the seal between the manifold 70 and the sensor 10, a combination of solder and pressure could be utilized. The application of compressive force, such as described above with respect to FIG. 3, allows for leveling of irregularities of the surface of the gold sealing ring 16, while the solder provides a semipermanent seal. In a preferred embodiment of the present invention, the manifold 70 would be comprised of stainless steel upon which successive layers of chrome, gold, germanium and gold are applied. This way, the solder melts at a lower temperature than the manifold surface.

In addition, FIG. 4 illustrates an alignment feature of this invention. An alignment wall 88 extends outwardly from the manifold 70 and forms a boundary for receiving the sealing ring 16. During assembly of the sensor 10 to the manifold 70, accurate alignment of the sensing element 18 and flow region 28 with the fluid intake 74 and exhaust 76 is readily achieved by ensuring engagement of the sealing ring 16 within the boundary provided by the alignment wall 88.

The flow sensors depicted in FIGS. 1 through 4 illustrate embodiments in which fluid flow is generally parallel to the surface of the semiconductor flow sensor 10. Such a configuration is useful for measuring the thermal conductivity of a fluid, the flow velocity of a fluid, and other properties. While a single sensing element 18 has been illustrated in the figures, it should be apparent that a plurality of sensing elements can also be disposed in the flow region 28. The use of a plurality of sensing elements enables accurate velocity measurement of the fluid, for example by pulsing or modulating the current on a first one of the sensing elements. In such a case, heat is transferred to the flowing fluid in a pulsed manner, and the subsequent sensing elements detect the heat pulses after a measured time delay, yielding a flow velocity value.

Figure 6:
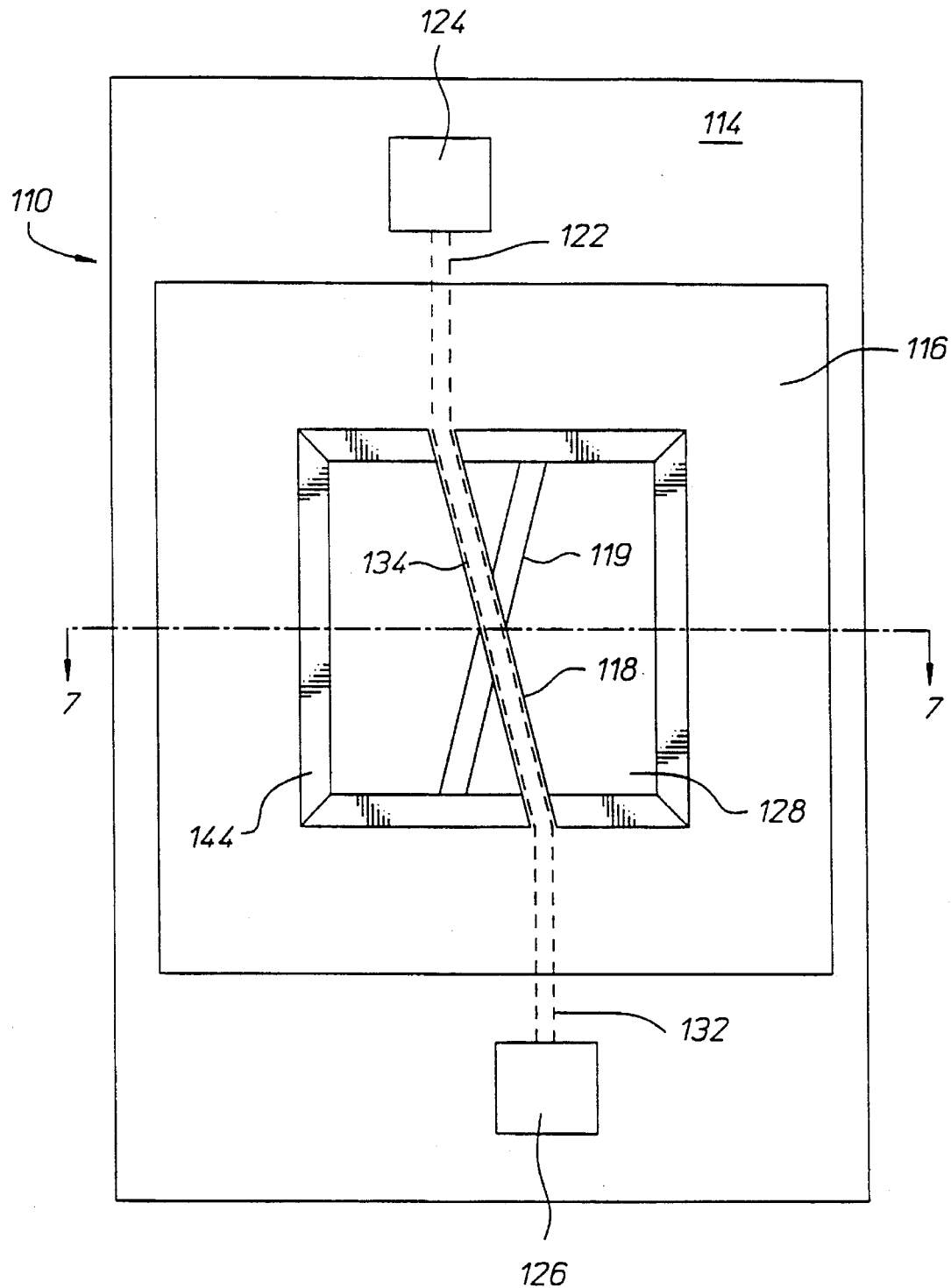
FIG. 6 is plan view of an alternative embodiment of the flow sensor.
Figure 7:
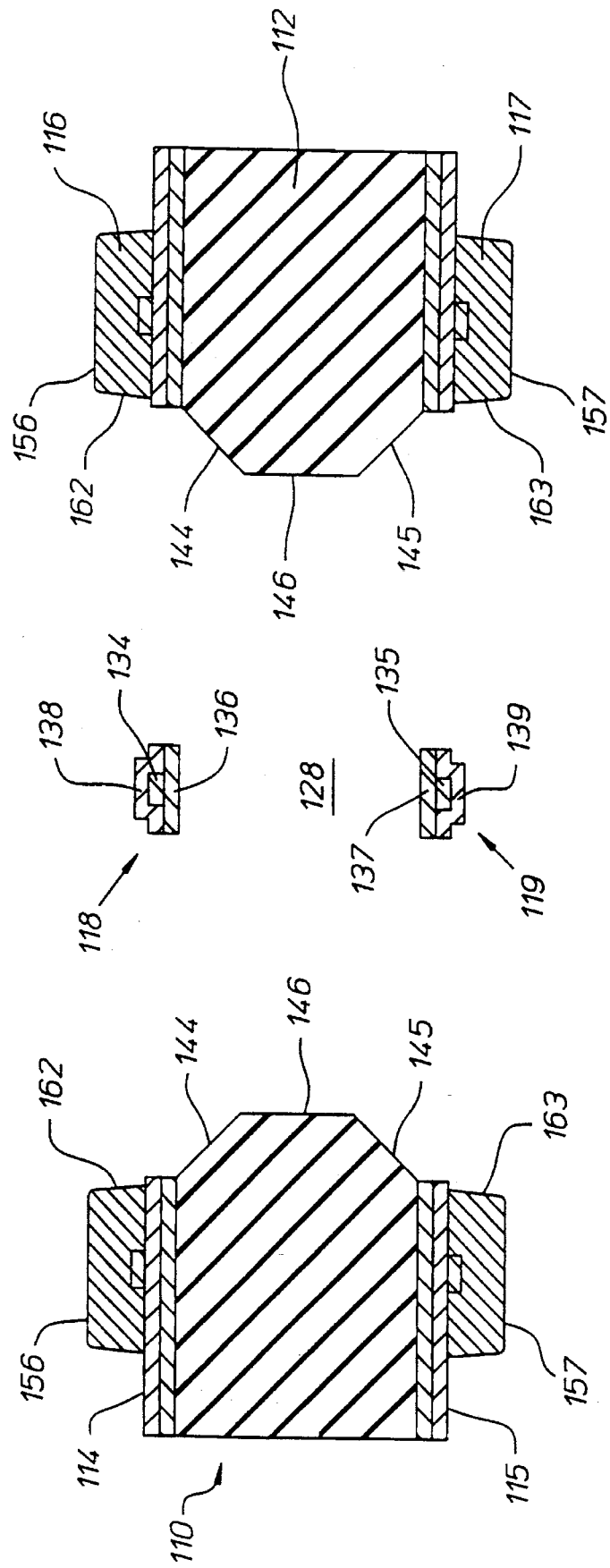
FIG. 7 is a side view of the alternative embodiment of the flow sensor, as taken through the section 7—7 of FIG. 6.

An alternative type of flow sensor is illustrated in FIGS. 6 through 9. In this embodiment of the invention, the direction of fluid flow is generally perpendicular to the flow sensor surface. Referring now to FIGS. 6 and 7, a semiconductor flow sensor 110 is illustrated. The flow sensor 110 has a substrate base 112 of a semiconductor material, with both an upper surface 114 and a lower surface 115 having an electrically insulative coating, such as low-stress silicon nitride. Centrally disposed on the sensor 110 is an opening 128 extending entirely through the substrate 112, having tapered sidewalls 144 and 145, and central sidewalls 146. The opening 128 forms a portion of a flow region for a fluid conducted from an inlet to an outlet flange.

The flow sensor 110 is similar to the flow sensor 10 described above, except that it has a sensing element disposed on both the upper and lower surfaces 114, 115. Sensing element 118 bridges across the opening 128 at the first surface 114, and sensing element 119 bridges across the opening at the second surface 115. The sensing elements 118 and 119 are otherwise substantially the same. As with the sensing element 18 described above, the sensing elements 118, 119 comprise a metal film 134, 135 of resistive material, such as platinum. Electrically insulative material, such as low-stress silicon nitride, is provided inward of the sensing elements 118, 119 at 136, 137, respectively, and outward of the sensing elements at 138, 139, respectively.

Conductive pathways 122, 132 are provided below the first outer surface 114 to contact pads 124, 126, respectively. In a similar manner, conductive pathways (not shown) below the second surface 115 of the sensor 110 are provided to electrical contact pads (not shown). The contact pads 124, 126 provide for electrical connection of the sensing elements to external voltage sources for conducting current through the respective sensing elements. The contact pads 124, 126 are disposed outside of the flow region 128, and are thus protected from any deleterious affects of the flow environment, such as corrosion.

Sealing rings 116 and 117 are integrally disposed on both the first and second surface 114, 115 of the sensor 110, respectively. The sealing rings 116, 117 of FIG. 7 have inner walls 162, 163 and contact surfaces 156, 157.

Figure 8:
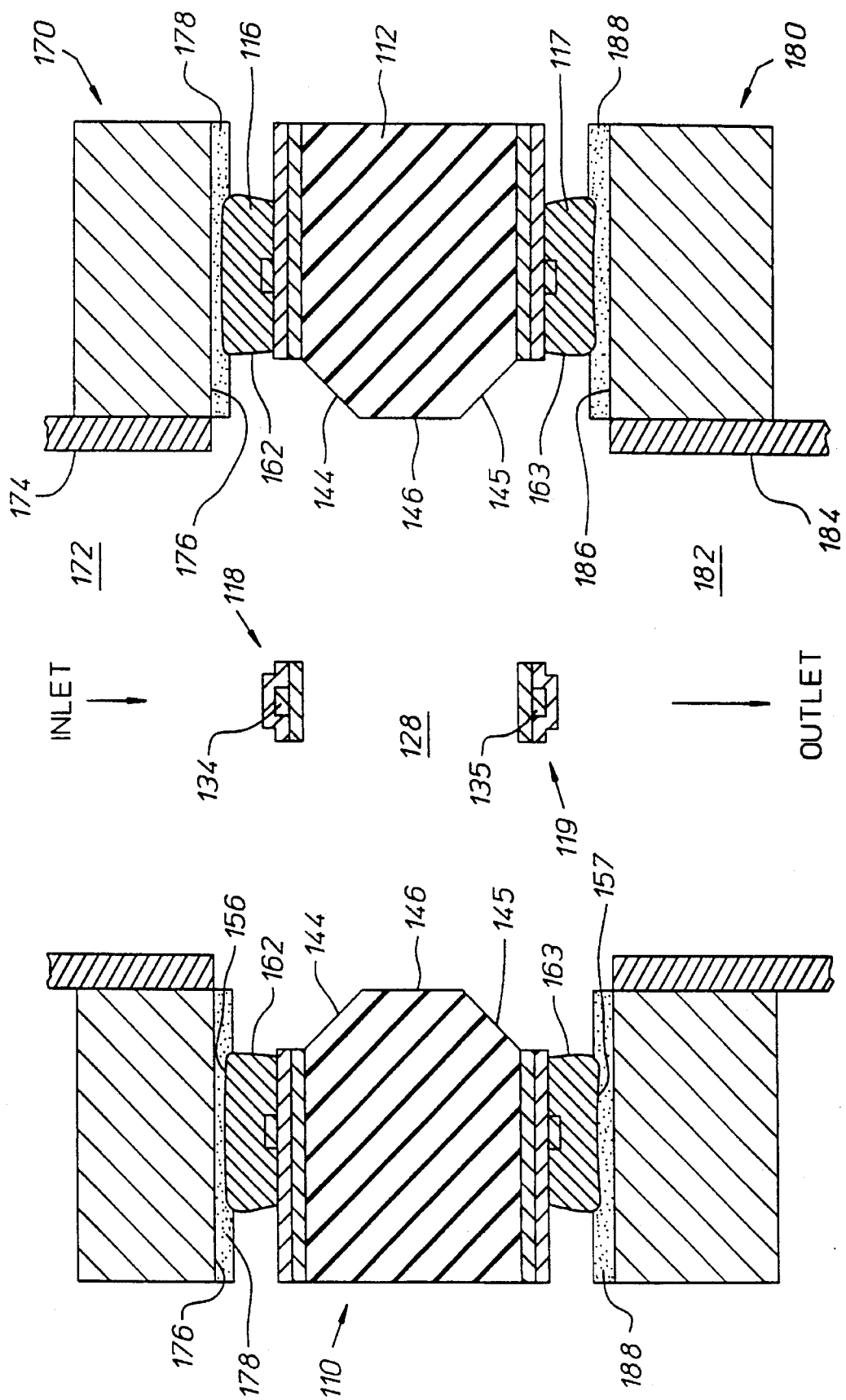
FIG. 8 is a side view of the alternative embodiment of the semiconductor flow sensor of FIG. 6, illustrating a solder bond engagement with respective inlet and outlet flanges.

FIG. 8 illustrates a semiconductor flow sensor 110 in use with an inlet flange 170 and an outlet flange 180. The inlet flange 170 has a mating surface 176 and an inlet pipe 174 which extends through the inlet flange to the mating surface providing a fluid inlet 172. Similarly, the outlet flange 180 has a mating surface 186 and an outlet pipe 184 which extends through the outlet flange to the mating surface providing a fluid outlet 182. A fluid under measurement flows from the fluid inlet 172 through the sensor 110 to the fluid outlet 182.

The sensor 110 is held in place between the opposed inlet and outlet flanges 170, 180 by either compressive force provided by conventional fasteners, such as bolts, or by thermal bond, such as solder. FIG. 8 illustrates the use of solder beds 178, 188 to thermally bond the sealing rings 116, 117 to the inlet and outlet mating surfaces 176, 186. The sealing rings 116, 117 provide a seal for the sensor 110 as substantially described above.

Figure 9:
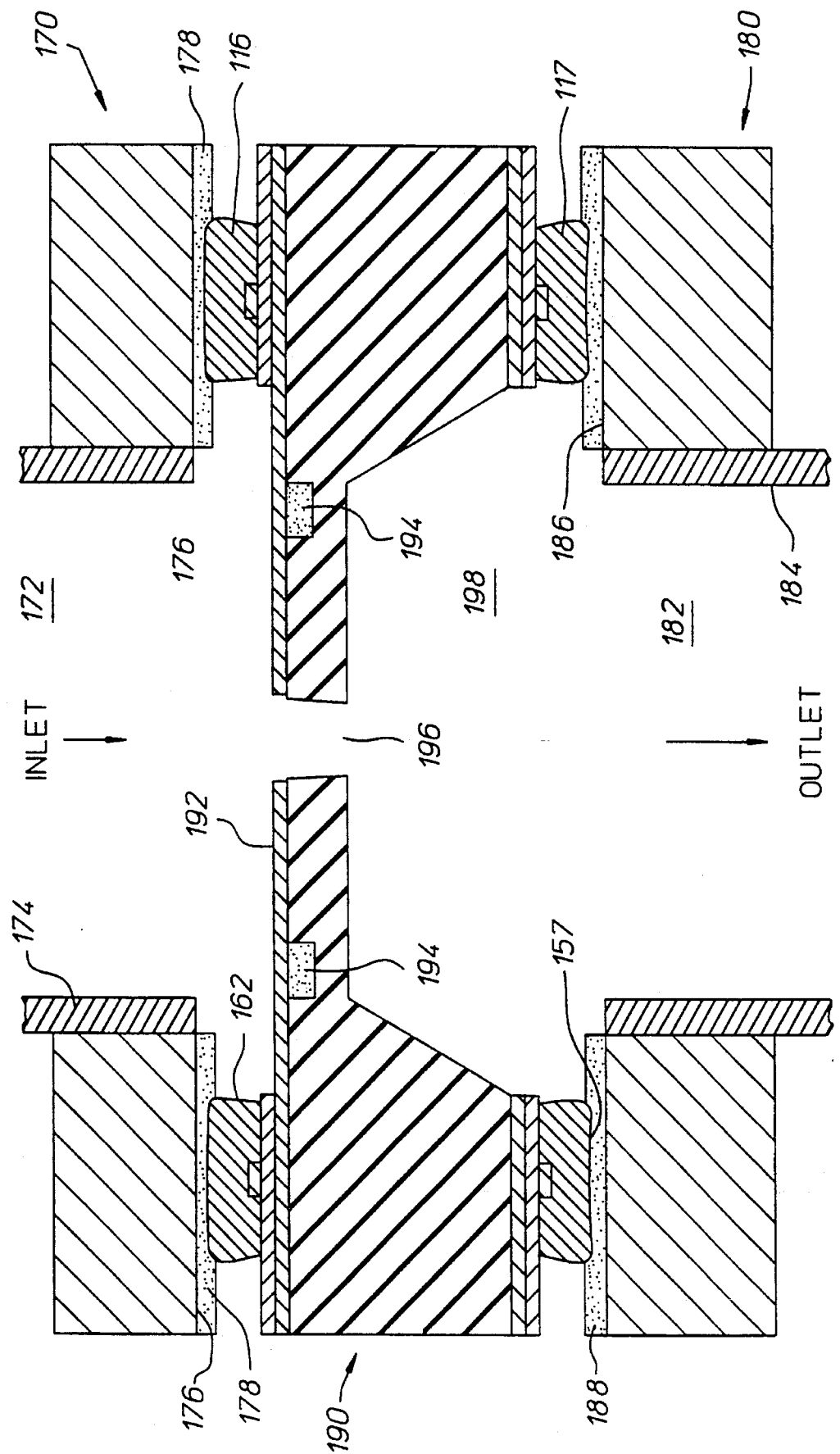
FIG. 9 is an additional alternative embodiment of the flow sensor of FIG. 6, utilizing piezoresistive sensing elements.

FIG. 9 illustrates an alternative embodiment of the flow sensor, utilizing piezoresistive sensing elements rather than metal film elements. Sensor 190 has a dam 192 blocking a substantial portion of the fluid flow from the inlet 172, and a channel 196 permitting passage of the fluid to the outlet 182. The channel 196 may be a simple hole or may have a complex shape which divides the dam 192 into substantially independent cantilevered flaps. Multiple instances of holes in the dam 192 may also be employed.

Piezoresistive elements 194 are disposed below the surface of the dam 192 and are electrically connected to contact pads as substantially described above. The channel 196 opens into an expanded region 198 before coupling to the outlet 182. As known in the art, piezoresistive elements provide an electric signal which corresponds to a stress applied to the elements. The fluid flow from the inlet 172 causes a bending or torsion stress on the dam 192, which is sensed by the piezoresistive elements 194. This pressure measurement is transduced to an electric signal representative of the fluid flow velocity or other characteristic of the fluid under measurement.

Figure 5A:
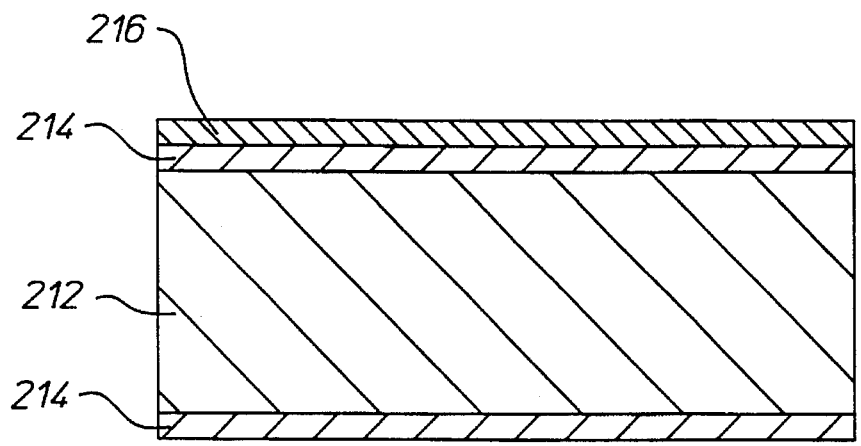
FIGS. 5A through 5K illustrate a side view of a semiconductor flow sensor in various stages of manufacture.
Figure 5B:
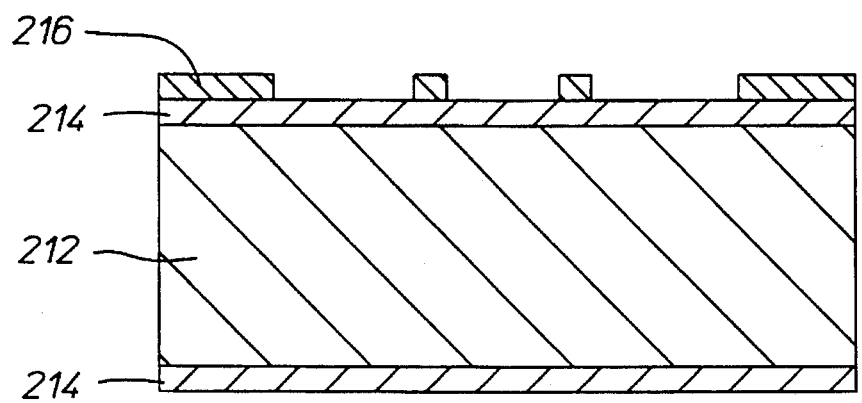
Figure 5C:
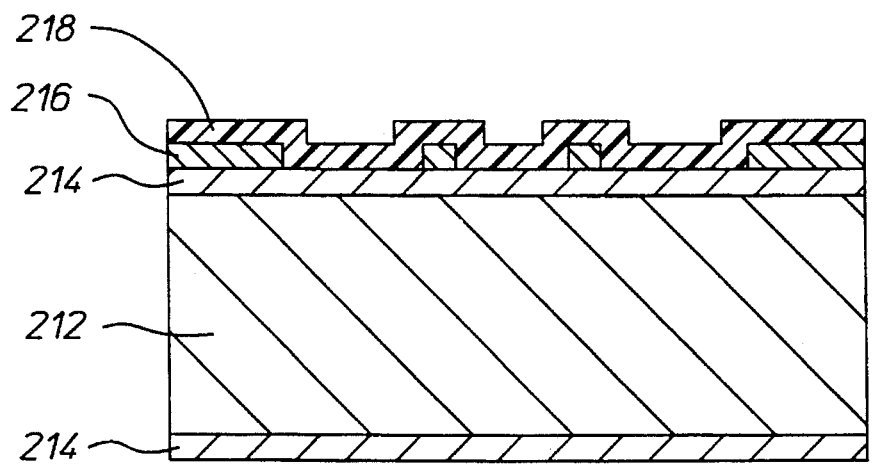

Batch fabrication of a semiconductor flow sensor is illustrated in FIGS. 5A through 5K. The process begins with a substrate layer 212 of semiconductor material, such as silicon. An initial layer of insulative material 214, such as low-stress silicon nitride, is deposited onto the substrate layer 212. Next, a layer of resistive metal 216, such as platinum, is applied onto the insulative layer 214 (FIG. 5A) by conventional process, such as sputtering. The resistive metal layer 216 is selectively etched (FIG. 5B) by ion milling using a first mask to form the internal resistive portion of the sensing elements, the conductive pathways and the electrical contact pads described above. After etching, a second layer of insulative material 218 is deposited over the entire substrate (FIG. 5C).

Figure 5D:
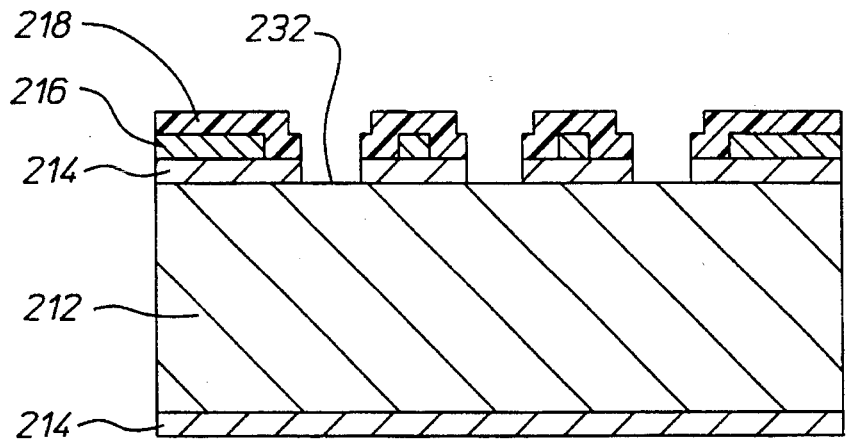
Figure 5E:
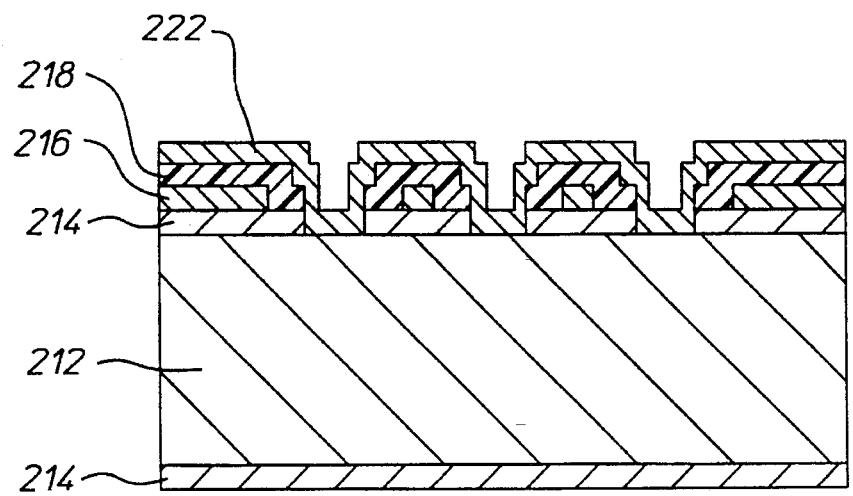
Figure 5F:
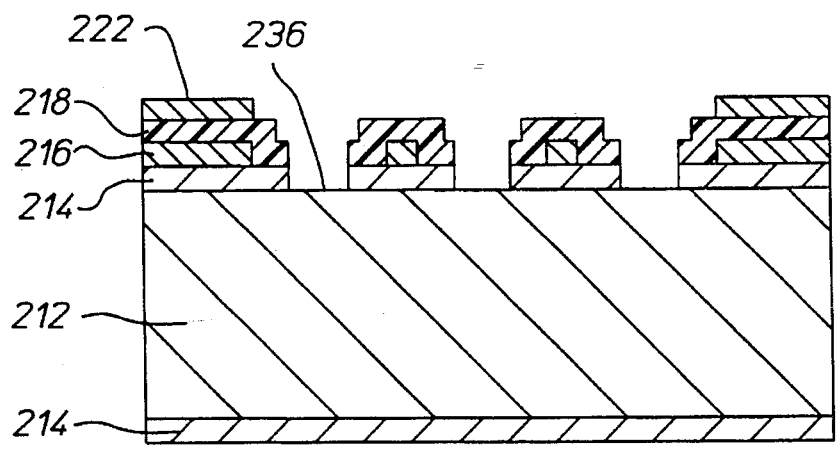
Figure 5G:
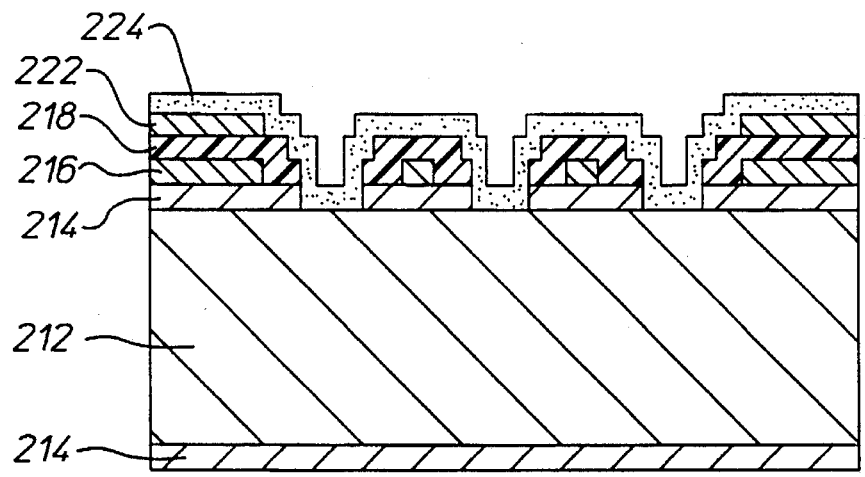
Figure 5H:
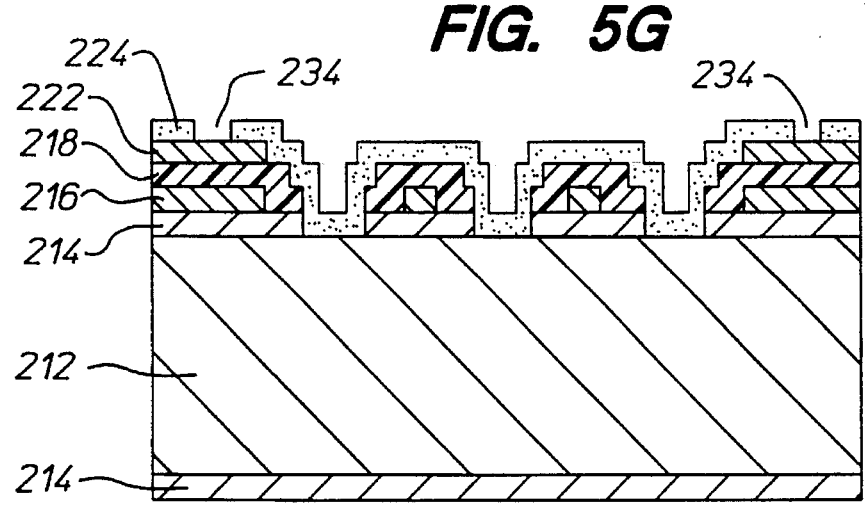

Using a second mask, windows 232 are etched into the insulative layers 214, 218 (FIG. 5D). A seed layer 222 of metal, or dual combination of metals, such as gold on top of chrome, is deposited onto the substrate (FIG. 5E). The seed layer 222 may comprise a relatively thin layer which provides electrical continuity for later electroplating of the sealing rings. The seed layer 222 also bonds to the platinum material forming the electrical contact pads (not shown in FIG. 5, but discussed above with respect to FIG. 1), providing an electrically conductive surface to permit attachment of a conductor from external to the sensor, such as wire.

Figure 5I:
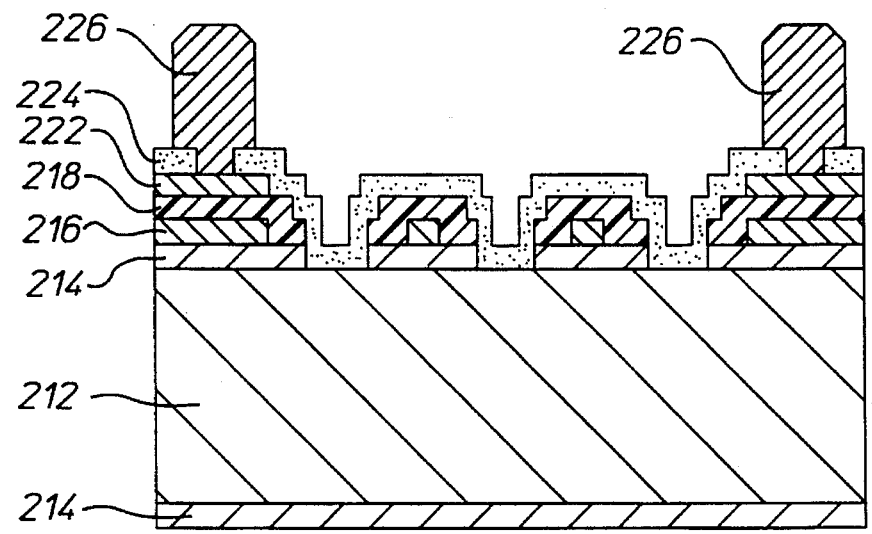

A third mask is used to etch a plating pattern opening window 236 into the deposited seed layer 222 (FIG. 5F), and at the same time, to etch the seed layer over the contact pads (not shown) into electrically separated regions which will not be plated. A third layer of insulative material 224 is deposited onto the entire substrate (FIG. 5G), and windows 234 are opened by use of a fourth mask through the third insulative layer (FIG. 5H) to permit the plating of sealing rings. The sealing rings 226 are then plated through the exposed windows 234 onto the seed layer 222 (FIG. 5I). The amount of material plated to form the sealing rings can be selectively varied to control the depth of the sensing elements within the flow region which will be subsequently formed. The plating of the sealing rings 226 includes the use of either electroplating or electroless-plating techniques.

Figure 5J:
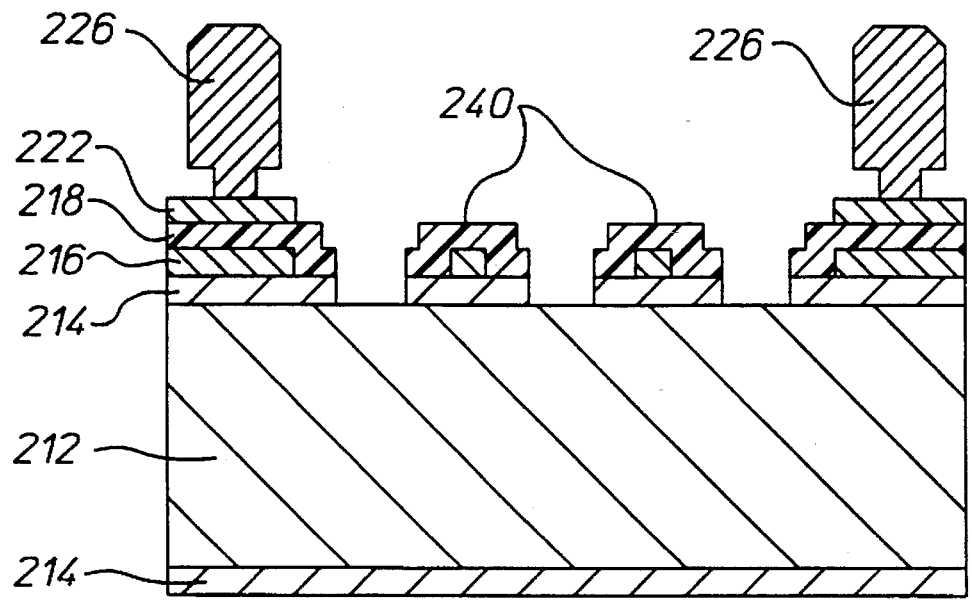
Figure 5K:
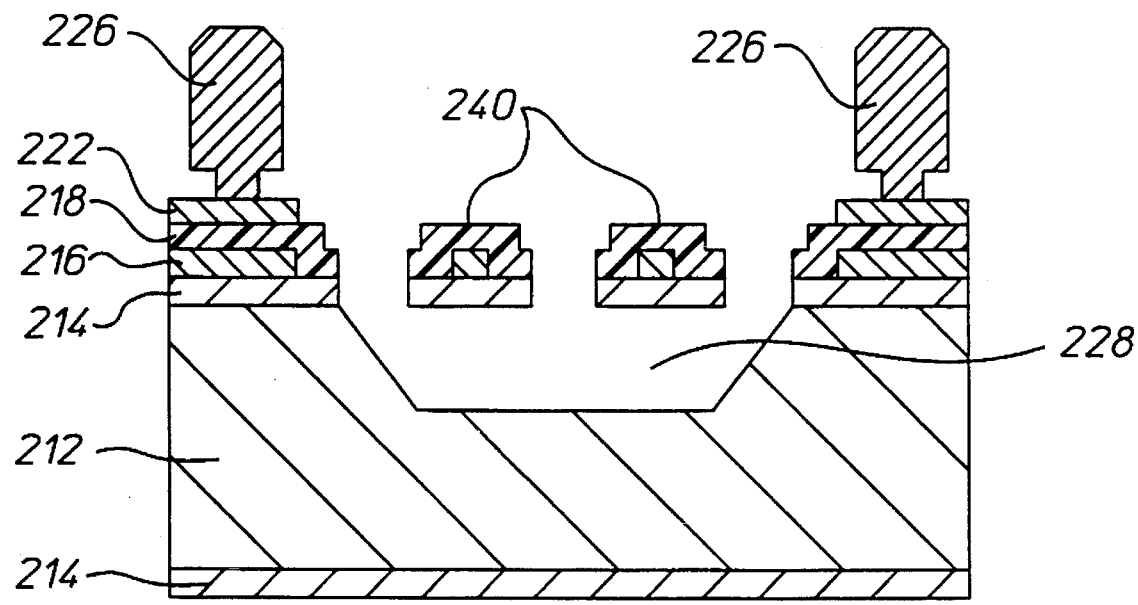

Upon reaching a desired height for the sealing rings 226, the third insulative layer 224 is removed (FIG. 5J). Finally, a depression 228 is etched into the silicon substrate 212 underneath the sensing elements to form the bridge portions 240 which provide the sensing elements on the flow sensor (FIG. 5K).

While the process described above discloses the formation of sensing elements on a single side of the substrate 212, it should be apparent that sensing elements could also be formed on the other side of the substrate to produce perpendicular flow sensors described previously with respect to FIGS. 6 through 9. It should also be apparent that a plurality of sensing elements could be formed on either of the substrate sides. The photolithographic operation permits precise alignment of the sealing ring to the sensing element within tolerances on the order of ±5 micrometers, minimizing stagnant volumes in the fluid flow system and allowing a high degree of reproducibility in both flow characteristics and sensor response.

It should be appreciated that the fabrication techniques suitable for fabricating semiconductor sensors such as flow sensors are also well suited for fabricating semiconductor actuators to be used in a fluid flow stream, and that the packaging requirements for such actuators are similar to those of the sensors discussed above. In the prior art, actuator elements such as bimetallic strips to form valves and piezoelectric bimorphs to form pumping elements have been incorporated into semiconductor actuators, but such devices suffer from packaging deficiencies similar to those of prior art fluid flow sensors. Hence, this invention is also applicable to semiconductor actuators to be used in fluid flow systems.

Additionally, it should be appreciated that sensing of a fluid property may often require some form of actuation. For example, a fluid velocity sensor can be formed using a resistive element which performs actuation by heating the liquid whose velocity is to be sensed and a second resistive element placed some distance away from the first which senses the temperature of the heated liquid as it flows past. The time required for the heated liquid to move from the first resistive element to the second resistive element gives information on the velocity of the liquid. Thus, the distinction between sensor and actuator is not absolute.

Having thus described a preferred embodiment of fluid property sensors incorporating plated metal rings for improved packaging, it should be apparent to those skilled in the art that certain advantages of the method and apparatus have been achieved. The invention is thus defined by the following claims.

I claim:

1. A flow sensor for use with a manifold, comprising:
   a semiconductor body;
   a sensing element supported by said semiconductor body; and
   a compressible metallic sealing ring integrally disposed on said semiconductor body aligned to said sensing element, said sealing ring providing a gas-tight seal between said sensor and said manifold.

2. The flow sensor of claim 1, wherein said sealing ring is plated to said semiconductor body.

3. The flow sensor of claim 1, wherein said sealing ring comprises gold.

4. The flow sensor of claim 1, further comprising a depression disposed in said semiconductor body, said depression providing a portion of a flow region for said fluid, and an inner wall of said sealing ring provides an additional portion of said flow region.

5. The flow sensor of claim 4, wherein said sensing element comprises a thin film heater bridging across said depression.

6. The flow sensor of claim 4, wherein a height measurement of said sealing ring above said semiconductor body determines a depth measurement of additional depth of said sensing dement above said semiconductor body within said flow region.

7. The flow sensor of claim 1, wherein said sensing element comprises a piezoresistive element.

8. The flow sensor of claim 1, further comprising means for compression bonding said sealing ring to said manifold.

9. The flow sensor of claim 1, further comprising means for solder bonding said sealing ring to said manifold.

10. The flow sensor of claim 1, further comprising means for aligning said sensor to said manifold.

11. A flow sensor disposed between a pair of opposing flanges, comprising:
    a semiconductor body having a fluid flow region;
    at least one sensing element bridging across a portion of said fluid flow region at a surface of said semiconductor body; and
    a compressible metallic sealing ring integrally disposed on said semiconductor body surface surrounding said at least one sensing element, said sealing ring providing a gas tight seal between said surface and an associated one of said flanges.

12. The flow sensor of claim 11, wherein said sealing ring is plated to said semiconductor body surface.

13. The flow sensor of claim 11, further comprising means for aligning said flow sensor to said flanges.

14. The flow sensor of claim 11, wherein said at least one sensing element further comprises a first sensing element disposed at a first surface of said semiconductor body and a second sensing element disposed at a second surface of said semiconductor body.

15. The flow sensor of claim 14, wherein sealing rings are disposed on both said semiconductor body surfaces.

16. The flow sensor of claim 11, wherein an inner wall of said sealing ring provides an additional portion of said flow region.

17. The flow sensor of claim 11, wherein said at least one sensing element comprises a piezoresistive element.

\* \* \* \* \*